(12) United States Patent
Guyader et al.

(10) Patent No.: US 8,872,026 B2
(45) Date of Patent: Oct. 28, 2014

(54) CONNECTING ARRANGEMENT FOR CONNECTING SUPPLY LINES OF RAILWAY VEHICLES

(75) Inventors: Cyrille Guyader, Osny (FR); Matthew Stubbs, Wiltshire (GB)

(73) Assignees: Tyco Electronics France SAS, Cergy Pontoise (FR); Tyco Electronics UK Ltd, Wiltshire (GB)

( * ) Notice: Subject to any disclaimer, the term of this patent is extended or adjusted under 35 U.S.C. 154(b) by 696 days.

(21) Appl. No.: 13/066,329

(22) Filed: Apr. 12, 2011

(65) Prior Publication Data

US 2011/0247850 A1 Oct. 13, 2011

(30) Foreign Application Priority Data

Apr. 12, 2010 (EP) .................................. 10290199

(51) Int. Cl.
*H02G 3/04* (2006.01)
*H02G 11/00* (2006.01)
*B61G 5/06* (2006.01)

(52) U.S. Cl.
CPC ................ *B61G 5/06* (2013.01); *H02G 11/006* (2013.01)
USPC ...... 174/72 A; 174/68.1; 174/68.3; 174/72 R; 439/207

(58) Field of Classification Search
USPC ........ 174/88 B, 68.1, 68.3, 72 B, 70 B, 72 R; 178/66.1; 439/35, 207
See application file for complete search history.

(56) References Cited

U.S. PATENT DOCUMENTS

| 1,856,455 | A | | 5/1932 | Banks et al. | |
| 3,098,892 | A | * | 7/1963 | Spade et al. | ..................... 174/47 |
| 7,183,502 | B1 | * | 2/2007 | Johnston et al. | .............. 174/480 |

FOREIGN PATENT DOCUMENTS

| DE | 4323540 C1 | 12/1994 |
| DE | 202005008668 U1 | 8/2005 |
| WO | 2005102744 A1 | 11/2005 |

OTHER PUBLICATIONS

European Search Report for EP10 29 0199 issued by the European Patent Office on Sep. 20, 2010, pp. 4.

* cited by examiner

*Primary Examiner* — Dhirubhai R Patel
(74) *Attorney, Agent, or Firm* — Faegre Baker Daniels LLP

(57) ABSTRACT

A connecting arrangement for connecting supply lines across a gap between railway vehicles is disclosed. The connecting arrangement electrically and pneumatically connects railway vehicles or pantographs of a train. The connecting arrangement may include at least one flexible electrical power line and at least one flexible fluid line. The at least one power line and the at least one fluid line may be preassembled to form an integral unitary structure.

20 Claims, 2 Drawing Sheets

CONNECTING ARRANGEMENT FOR CONNECTING SUPPLY LINES OF RAILWAY VEHICLES

BACKGROUND OF THE INVENTION

The invention relates to a connecting arrangement for connecting supply lines across a gap between railway vehicles, comprising at least one flexible power line and at least one flexible fluid line.

It is common practice to use a plurality of railway vehicles or locomotives coupled together. The vehicles may be interconnected electrically and pneumatically to provide power there between and to enable a locomotive driver to simultaneously actuate the controls of all vehicles from one control panel.

Electrical connections between vehicles and between pantographs of adjacent vehicles, respectively, are conventionally provided by jumper cables which are releasably or permanently installed on adjacent ends of the coupled vehicles.

To connect vehicles or pantographs to a fluid circuit of a train, e.g. a pneumatic circuit, connecting tubes may be arranged between adjacent vehicles and between adjacent pantographs, respectively. As well as the jumper cables, the connecting tubes must be configured flexible to compensate relative movements between adjacent vehicles. The fluid lines may serve to control pneumatic or electro-pneumatic brakes of the vehicles and to activate or to power pantographs, which are usually arranged on the roof of railway vehicles.

Connecting arrangements of the type described above are not entirely satisfactory due to the fact that, in particular when coupling vehicles of a train, a high number of power lines and fluid lines have to be handled to interconnect the power and fluid circuits. Hence, operating and mounting of the known connecting arrangements is cumbersome and expensive.

Thus, an object of the present invention is to provide an improved connecting arrangement for electrically and pneumatically connecting railway vehicles or pantographs of a train, which is easy to handle.

SUMMARY OF THE INVENTION

This object is solved by the present invention in that the at least one power line and the at least one fluid line are preassembled to form an integral unitary structure.

An advantage of the solution according to the invention is the reduction of the number of parts which have to be mounted. The solution results in an integrated connecting arrangement having a reduced weight. Furthermore, the combination of at least one power line and at least one fluid line in one connecting arrangement facilitates handling and operation of the connecting arrangement and allows for a space saving arrangement on the vehicle.

The solution according to the invention may be combined in any way with the following further advantageous embodiments respectively and further improved.

The connecting arrangement according to the present invention may serve to interconnect power lines and fluid lines of pantographs, which are disposed adjacent to each other, but on different vehicles. Thus, the fluid lines may be configured to supply interconnected pantographs with pressurized air, e.g. for operating drives of the pantographs. For supplying several devices independently with pressurizes fluid, the connecting arrangement may comprise at least two fluid lines.

In a further advantageous embodiment of the present invention, the power line can constitute a part of a supporting structure which carries the fluid line, in order to avoid a damage of the fluid lines caused by undue deformation or bending. Hence, an increased reliability is provided.

According to a further advantageous embodiment, the power line may constitute a protective cover, covering the at least one fluid line at least sectionally. The power line may protect the fluid line against external forces or overloads and against environmental influences, as ultraviolet radiation.

In order to improve the self supporting function of the power line, the power line may be formed as a power cable comprising fibre reinforced polymer substrate coupled to a metal conductor. The fibre reinforcement can be realised by fibreglass. Ideally, the fibre reinforced polymer substrate and the metal conductor are together encased in a heat shrink tubing.

To adjust movements between connecting portions of a connecting arrangement, which can result from movements of connected vehicles, the connecting arrangement may be adapted to flex dynamically in three dimensions and/or to rotate to adapt the bridged distance when the distance between vehicles or pantographs changes. The connecting arrangement is preferably configured self supporting, even when the power line contains very large electrically conducting braids. For example, the braids may weight up to 18 kg and transmit up to 2,500 Amps.

In a further advantageous embodiment according to the present invention, the connecting arrangement may comprise at least one attachment member which fixes the at least one power line and the at least one fluid line to one another. The attachment member may be at least sectionally flexible to enable the components of the connecting arrangement to align to each other, also when the connecting arrangement is deformed. The attachment member can be formed from at least one heat shrink tubing, or from at least two heat shrink tubings which intermesh with each other.

To affix the fluid line inseparable to the power line, the attachment member can surround the power line and the fluid line at least sectionally. For example, a heat shrink tubing can be imposed on at least a section of the power line and the fluid line, at which the power line and the fluid line extend in parallel. To compensate varying diameters of the at least one power line and the at least one fluid line, the attachment member may comprise two heat shrink tubings, the first heat shrink tubing surrounding the power line and the fluid line, the second heat shrink tubing being arranged between the power line and the fluid line and surrounding the first heat shrink tubing. Thus, the second heat shrink tubing may tighten the portions of the first heat shrink tubing which extend from the power line to the fluid line, when the heat shrink tubings are shrunk.

In order to allow for load releasing relative movements between the power line and the fluid line, the attachment member may extend over a section of the connecting arrangement. The connecting arrangement may be provided with a plurality of attachment members which are disposed spaced apart from each other.

In a further advantageous embodiment of the present invention, the attachment member can be provided with at least one receiving organ for receiving the fluid line. The receiving organ may serve as reinforcement or stiffening to avoid a compression of the fluid line by the attachment member. The lifetime of the power line can be for example about 30 years, the lifetime of the fluid line about 7 years. Thus, the fluid lines have to be replaced several times while the power line can remain in a mounted state. To facilitate the replacement of the fluid line, independently from the power line, the receiving organ may be configured to facilitate the detachment of the fluid line. For example, the receiving organ may be shaped ring-like, the fluid line being adapted to be inserted into the receiving organ.

To allow for compensating motions of the fluid line relatively to the power line, the fluid line can be received loosely by the receiving organ. Hence, when the connecting arrangement is bent or rotated elastically, the receiving organs may facilitate adjustments of the connecting arrangement or of the power line and the fluid line extending in parallel.

In a further advantageous embodiment of the present invention, the fluid line can be received by the receiving organ slidably along its longitudinal direction. To enable such a sliding movement, the receiving organ can preferentially be formed as a sleeve. For decreasing the friction between the receiving organ and a fluid line, the receiving organ can be made of a material having a low coefficient of friction, in particular brass.

In order to improve the flexibility of the connecting arrangement, in particular at a mid-section of the connecting arrangement, the connecting arrangement can. comprise an even number of attachment members, the attachment members being arranged symmetrically with respect to the midsection of the connecting arrangement.

In a further advantageous embodiment according to the present invention, the connecting arrangement may comprise at least four attachment members 20, 22, 24, 26, wherein the distance 30 between two attachment members 24 and 26 arranged adjacent to the centre is larger than the distance 32 or 34 between two attachment members 20 and 24 or 22 and 26 arranged adjacent to each other on one side of the mid-section. As shown in FIG. 1, a first attachment member 20 is positioned proximate a first end of the power line 2 and a second attachment member 22 is proximate a second end of the power line 2, a third attachment member 24 and a fourth attachment member 26 are positioned between the first attachment member 20 and the second attachment member 22 along the length of the power line. The third attachment member 24 being closer along the length of the power line to the first attachment member 20 than to the second attachment member 22 and the fourth attachment member 26 being closer along the length of the power line to the second attachment member 22 than the first attachment member 20. The third attachment member 24 and the fourth attachment member 26 being spaced apart along the length of the power line 2 by a first separation 30. The first separation 30 being greater than a second separation 32 along the length of the power line 2 between the first attachment member 20 and the third attachment member 24 and the first separation 30 being greater than a third separation 34 along the length of the power line 2 between the second attachment member 22 and the fourth attachment member 26.

In order to reduce the wear of the shell of the fluid line, in particular at portions of the fluid line which are arranged in engagement with the attachment member or with the receiving organ, the shell of the fluid line can be provided with at least one reinforcement organ. The reinforcement organ can be engaged by the at least one attachment member. The reinforcement organ can be formed from a shrink tubing which can be shrunk and/or stuck onto the fluid line. To facilitate sliding of the at least one fluid line within the receiving organ, the reinforcement organ may be provided with an outer surface having a low efficient of friction. Additionally or alternatively, the reinforcement organ may be provided with lubricants.

In order to allow for movements between connected ends of the connecting arrangements, the connecting arrangement can be, at least in the mounted state, flexed into an arc. To improve the protective function of the power line, which may serve as protective shield for protecting the at least one fluid line against radiation and other environmental influences, the fluid line can be arranged at an inner side or a bottom side of the arc. Further, the power line may be shaped bent-like with a rectangular cross section. The power line can be bent in the direction of a broad side of the rectangular cross section and form a protective shield to protect the fluid line.

In a further advantageous embodiment of the present invention, a shell of the at least one fluid line can be provided with a semiconductive layer, in order to avoid micro-electrical discharges between the power line and the fluid line which could generate heat damages. The shell may be covered, coated, or impregnated with carbon. Alternatively or additionally, the shell may be provided with a semiconductive layer made of a carbon-impregnated polymer, such as a semiconductive PTFE.

For an improved self supporting function of the power line, the power line may comprise a self supporting, fibre reinforced polymer substrate coupled to a metal conductor. To realise a flexibility or rigidity gradient within the power line, the fibreglass substrate may be tapered. For example, the fibreglass substrate can taper from the midsection in the direction to the ends of the power line.

The invention will be described hereinafter in greater detail and in an exemplary manner using advantageous embodiments and with reference to the drawings.

The described embodiments are only possible configurations in which, however, the individual features as described above, can be provided independently of one another or can be omitted. In the drawings:

Figure 1:
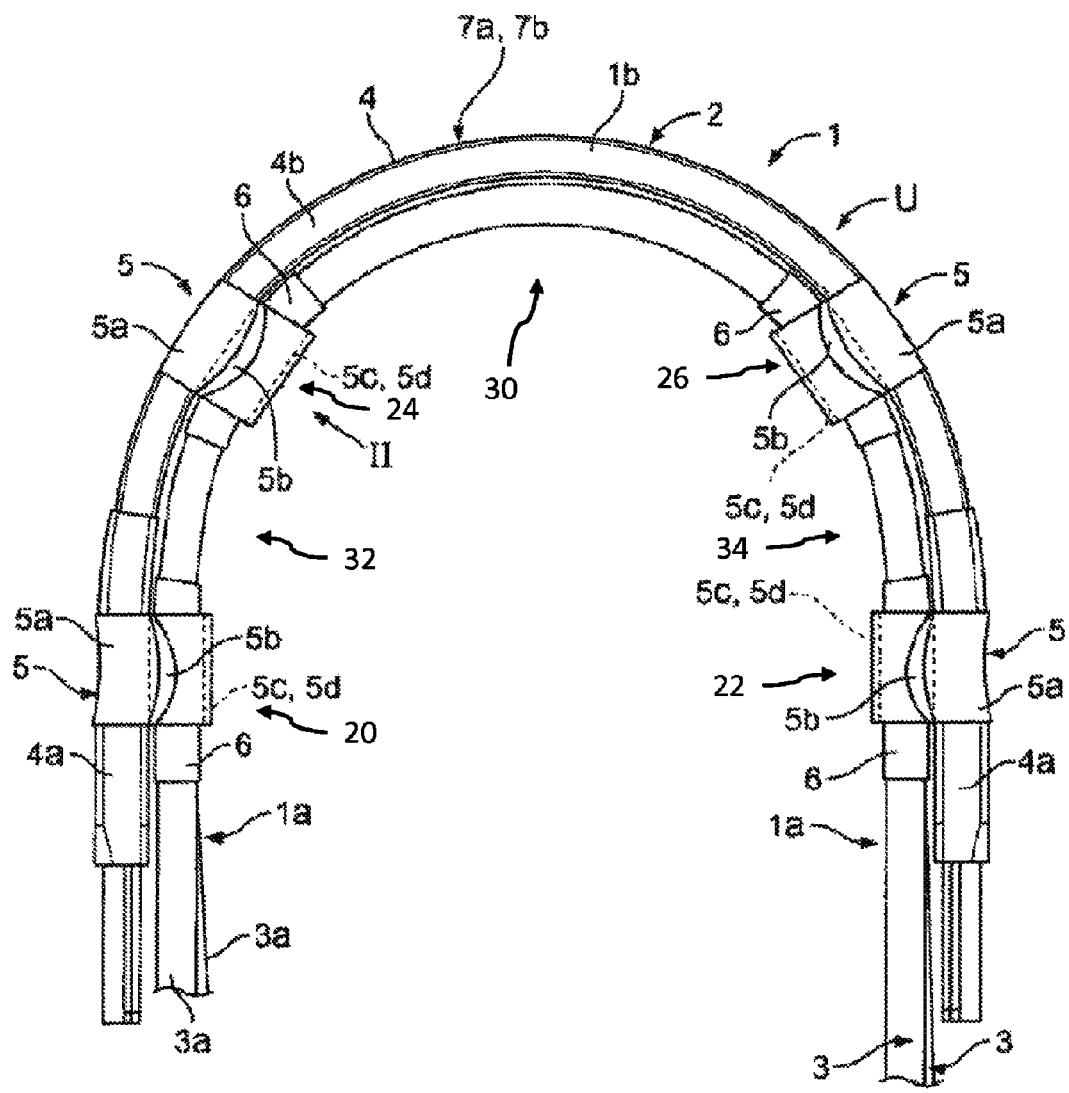
FIG. 1 is a schematic side view of a connecting arrangement configured according to the present invention.

Firstly, a connecting arrangement according to the invention will be described with reference to FIG. 1.

DETAILED DESCRIPTION OF THE INVENTION

The connecting arrangement 1 comprises a power line 2 and two fluid lines 3. The fluid lines 3 are affixed to the power line 2 and, at least sectionally, extend in parallel with the power line. The power line 2 serves as jumper cable for AC or for DC applications and is optimised for use in the rail environment. To reduce the risk of flashovers, the power line 2 is provided with an insulation 4. The insulation 4 has end sections 4a and a middle section 4b, each section 4a, 4b being formed from a heat shrink tubing.

Within the end sections 4a , sealants (not shown) are arranged, rendering the power cable weather proof. Due to a gap between the middle section 4b and the sealants arranged within the ends of the insulations 4a, diminutions are formed by the insulation at which attachment members 5 are disposed. The attachment members 5 serve to affix the fluid lines 3 at end sections 1a of the connecting arrangement 1. As these attachment members 5 are located within the diminutions, they are secured against slipping by a positive lock.

Additional attachment members 5 are arranged adjacent to a mid section 1b of the connecting arrangement. To achieve a highest possible flexibility at the mid section 1b, the distance between the attachment members 5 adjacent to the mid section 1b is larger than the distance between two attachment members 5 arranged at one side of the mid section 1b.

Each attachment member 5 comprises two heat shrink tubings 5a, 5b and a receiving organ 5c, which is represented by a dashed line and constitutes a shell or sleeve 5d. The shrink tubings 5a surround the power line 2 and the two fluid lines 3 extending in parallel with the power line 2. The shrink tubings 5b are disposed between the power line 2 and the fluid lines 3 and in each case surround the shrink tubings 5a. The shrink tubings 5b surround the loop which is formed by the shrink tubings 5a and at least in a shrunk state tighten the shrink tubings 5a. Thereby the shrink tubings 5b improve the fixation of the fluid lines 3 to the power line 1, despite of the different perimeters of the fluid lines 3 and the power line 1.

The receiving organs 5c are preferably made of brass and serve as guidance for the fluid lines 3. As the fluid lines 3 are arranged movable within the receiving organs 5c, the fluid lines 3 can be replaced without dismounting the attachment members 5 or the power lines 2. Thus, the maintenance of the connecting arrangement is facilitated and the fluid lines can be changed without any specific tool. For example, the lifetime of the power line 2 can be 30 years, the lifetime of the fluid lines can be 7 years. Further, the sleeves 5d may serve as reinforcements to avoid a compression of the fluid lines by the attachment members.

In order to decrease the friction between the fluid lines 3 and the sleeves 5d and to reinforce shells 3a of the fluid lines 3, the fluid lines 3 are provided with reinforcement organs 6. The reinforcement organs 6 are formed from heat shrink tubings. Each reinforcement organ 6 surrounds both fluid lines 3 and thereby connects the fluid lines 3 to each other.

The connecting arrangement 1 is, at least in the mounted state, flexed into an arc U, the fluid line 3 being arranged at an inner side of the arc U. The arc may be constituted by the power line 2, or be formed elastically resiliently, when the connecting arrangement 1 is mounted between two pantographs. The connecting arrangement is substantially U-shaped, wherein the fluid lines 3 are arranged at the inner side of the also U-shaped power line 2. Thereby, the power line 2 may constitute a protective cover 7b, which serves for protecting the fluid lines 3 against environmental influences and mechanical damages.

Further, at least at a mounted state of the connecting arrangement 1, the power line 2 forms a resiliently deflectable supporting structure 7a which carries the fluid lines 3. The power line 2 may comprise a self supporting, fibre reinforced polymer substrate coupled to a metal conductor. To realise a flexibility or rigidity gradient within the power line, the fibreglass substrate may taper from the mid-section in the direction to the ends of the power line.

Figure 2:
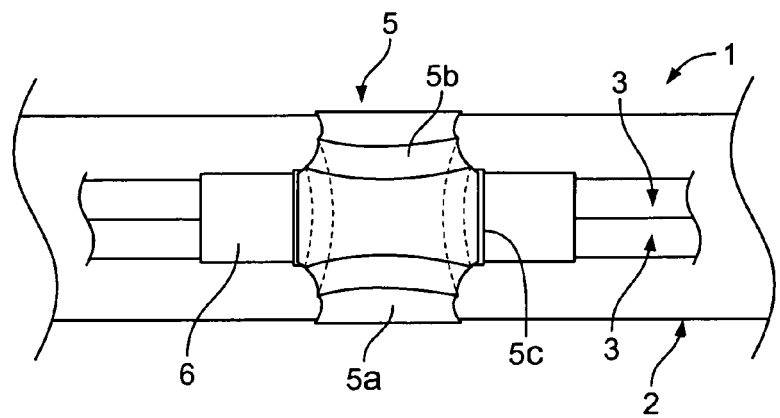
FIG. 2 a partial view according to the direction of projection II in FIG. 1.

FIG. 2 is a side view of the connecting arrangement 1 at II of FIG. 1.

The attachment member 5 has two shrink tubings 5a and 5b for affixing the fluid lines 3 to the power line 2. The shrink tubing 5a encompasses the fluid lines 3 as well as the power line 2. To tighten the shrink tubing 5a, in particular at the position of the fluid lines 3 and of the sleeve 5d, respectively, the second shrink tubing 5b encloses the shrink tubing 5a. The second shrink tubing 5b is, at least sectionally, disposed between the fluid lines 3 and the power line 2 and engages behind the fluid lines 3. Further, as shown by dashed lines, the shrink tubing 5e extends and engages behind the sleeve 5d.

Figure 3:
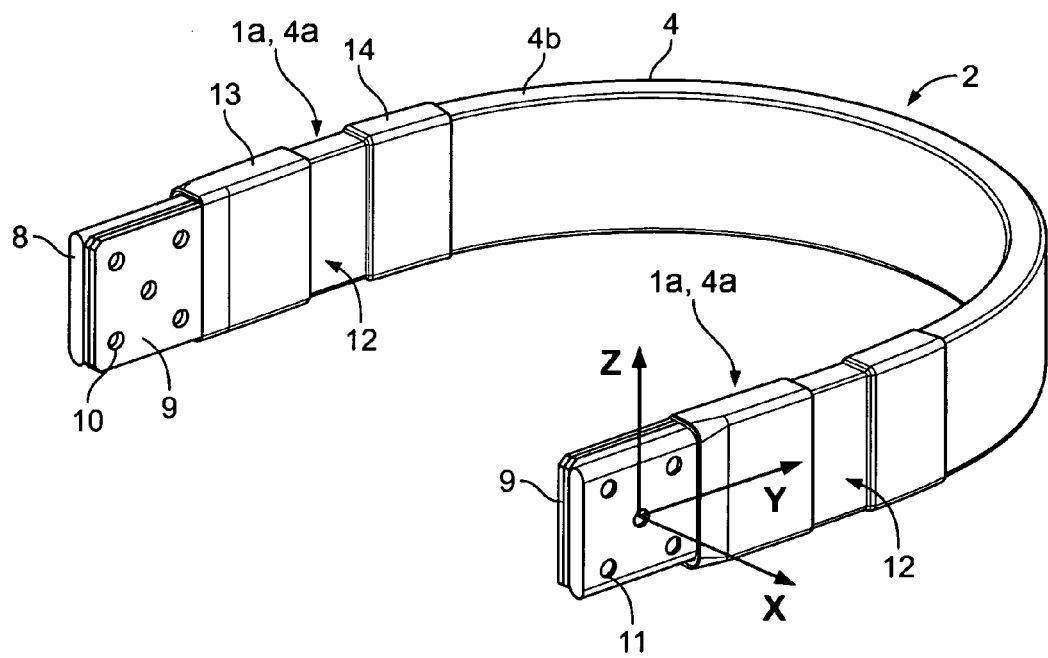
FIG. 3 is a schematic perspective view of a power line of a connecting arrangement without a fluid line.

FIG. 3 is a schematic perspective view of a power line without fluid lines, and the same reference numerals have been used.

For connecting high voltage roof lines on trains, the power line 2 is configured to be flexed in or against 3 directions X, Y, Z. For affixing a braid 8 of the power line 2 to pantographs which are arranged adjacent to each other, plates 9 are arranged on the inner sides of the braid 8. Through holes 10, 11 in the plates 9 and at the ends of the braid 8 serve for screwing the connecting arrangement 1 to the pantographs, which have to be interconnected. The through holes 10, 11 at the ends of the connecting arrangement 1 may serve to screw the connecting arrangement 1 to connecting panels at the pantographs. The connecting arrangement 1 is configured to be permanently mounted to adjacent pantographs.

At end sections 1a of the connecting arrangement 1, the power line 2 is provided with cross section diminutions 12, at which in a mounted state, as shown in FIG. 1, attachment members 5 are arranged. By receiving the shrink tubings 5a, the diminutions 12 serve to generate a form closure which avoids movements of the attachment members 5 and reinforces the connection between the fluid lines 3 and the power line 2.

The diminutions 12 are framed by thickened portions 13, 14. The thickened portions 13 are formed by the end sections 4a and the underlying sealant (not shown), the thickened portions 14 by the end sections 4a and, the underlying portions of the middle section 4b.

For mounting the fluid lines 3, the fluid lines 3 can be provided with connection pieces (not shown). The fluid lines 3 may configured for the transportation of pressurized air and to be connected to a pneumatic drive of a pantograph. Advantageously, the power line 2 and the fluid lines 3 are connected to a common connecting panel at a pantograph. Thus, relative movements of the fluid lines 3 with respect to the power line 2 are minimized. The connecting plate may be made of a bent sheet metal and can be provided with connection pieces which are usual in the trade.

The invention claimed is:

1. Railway vehicle connecting arrangement for spanning a gap between railway vehicles to connect the supply lines of the railway vehicles, the railway vehicle connecting arrangement comprising: at least one flexible electrical power line; and at least one flexible fluid line which is carbon covered in order to avoid micro-electrical discharges between the power line and the fluid line, wherein the at least one power line and the at least one fluid line are preassembled to form an integral unitary structure, wherein the power line forms a part of a supporting structure which carries the at least one fluid line.

2. Railway vehicle connecting arrangement according to claim 1, wherein the power line forms the supporting structure which carries the at least one fluid line when the connecting arrangement is, at least in the mounted state, flexed into an arc.

3. Railway vehicle connecting arrangement according to claim 1, wherein the power line forms a protective cover, covering the at least one fluid line at least sectionally.

4. Railway vehicle connecting arrangement according to claim 1, further comprising at least one attachment member, wherein the at least one attachment member fixes the at least one power line and the at least one fluid line to one another.

5. Railway vehicle connecting arrangement according to claim 4, wherein the attachment member surrounds the power line and the fluid line at least sectionally.

6. Railway vehicle connecting arrangement according to claim 4, wherein the attachment member is provided with at least one receiving organ for receiving the fluid line.

7. Railway vehicle connecting arrangement according to claim 6, wherein the fluid line is received loosely by the receiving organ.

8. Railway vehicle connecting arrangement according to claim 6, wherein the fluid line is received by the receiving organ slidably along its longitudinal direction.

9. Railway vehicle connecting arrangement according to claim 6, wherein the receiving organ is constitutes a sleeve.

10. Railway vehicle connecting arrangement according to claim 1, wherein the connecting arrangement comprises an even number of attachment members, the attachment members being arranged symmetrically with respect to a mid section of the connecting arrangement.

11. Railway vehicle connecting arrangement according to claim 1, wherein the connecting arrangement comprises at least four attachment members, wherein the distance between two attachment members arranged adjacent to a mid section is larger than the distance between two attachment members arranged adjacent to each other on one side of the mid section.

12. Railway vehicle connecting arrangement according to claim 1, wherein a shell of the fluid line is provided with at least one reinforcement organ which is engaged by the at least one attachment member.

13. Railway vehicle connecting arrangement according to claim 1, wherein the power line is a power cable comprising a fiber reinforced polymer substrate coupled to a metal conductor.

14. Railway vehicle connecting arrangement for spanning a gap between railway vehicles to connect the supply lines of the railway vehicles, the railway vehicle connecting arrangement comprising:
   at least one flexible electrical power line; and
   at least one flexible fluid line, the at least one power line and the at least one fluid line are preassembled to form an integral unitary structure, wherein the connecting arrangement is, at least in the mounted state, flexed into an arc, the fluid line being arranged at an inner side of the arc and the power line being arranged at an outer side of the arc further from a center of the arc than the fluid line.

15. Railway vehicle connecting arrangement for spanning a gap between railway vehicles to connect the supply lines of the railway vehicles, the railway vehicle connecting arrangement comprising:
   at least one flexible electrical power line;
   at least one flexible fluid line; and
   at least four attachment members spaced apart along a length of the power line, the at least four attachment members fixing the at least one power line and the at least one fluid line to one another, wherein a first attachment member is positioned proximate a first end of the power line and a second attachment member is proximate a second end of the power line, a third attachment member and a fourth attachment member are positioned between the first attachment member and the second attachment member along the length of the power line, the third attachment member being closer along the length of the power line to the first attachment member than to the second attachment member and the fourth attachment member being closer along the length of the power line to the second attachment member than the first attachment member, the third attachment member and the fourth attachment member being spaced apart along the length of the power line by a first separation, the first separation being greater than a second separation along the length of the power line between the first attachment member and the third attachment member and the first separation being greater than a third separation along the length of the power line between the second attachment member and the fourth attachment member.

16. Railway vehicle connecting arrangement according to claim 15, wherein each of the at least four attachment members surround the power line and the fluid line at least sectionally.

17. Railway vehicle connecting arrangement according to claim 15, wherein each of the at least four attachment members is provided with at least one receiving organ for receiving the fluid line.

18. Railway vehicle connecting arrangement according to claim 17, wherein the fluid line is received loosely by the receiving organ of each of the at least four attachment members.

19. Railway vehicle connecting arrangement according to claim 17, wherein the fluid line is received by the receiving organ of each of the at least four attachment members slidably along its longitudinal direction.

20. Railway vehicle connecting arrangement according to claim 17, wherein the receiving organ of each of the at least four attachment members is a sleeve.

* * * * *